Jan. 20, 1942.  G. E. BARNHART  2,270,494
INSTRUMENT TO INDICATE AIR PRESSURE AND TEMPERATURE
Filed Jan. 2, 1940
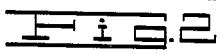
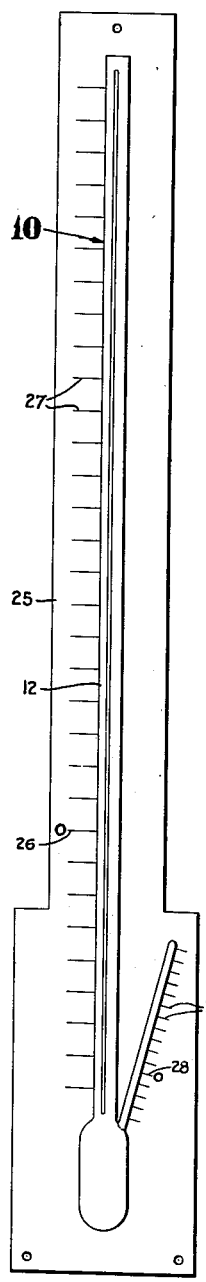
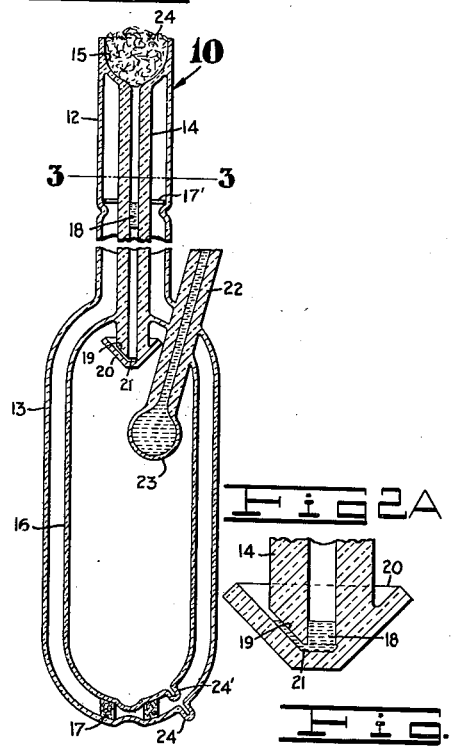
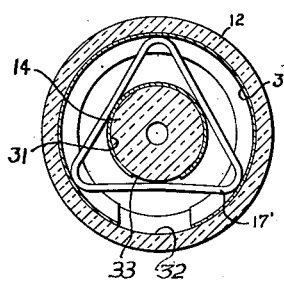
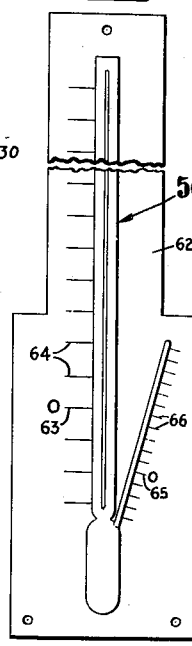
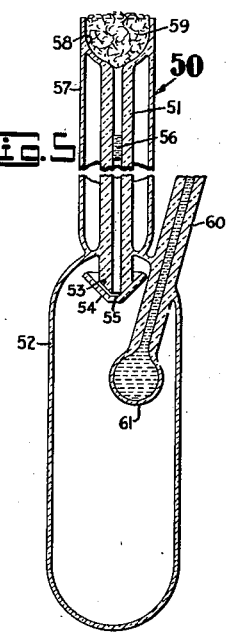
INVENTOR.
George E. Barnhart.
BY
ATTORNEY.

Patented Jan. 20, 1942

2,270,494

UNITED STATES PATENT OFFICE 2,270,494

INSTRUMENT TO INDICATE AIR PRESSURE AND TEMPERATURE

George E. Barnhart, Pasadena, Calif.

Application January 2, 1940, Serial No. 311,999

6 Claims. (Cl. 73—4)

This invention relates to scientific instruments. The general object of the invention is to provide a novel instrument for determining atmospheric conditions.

Another object of the invention is to provide a novel barometer.

A further object of the invention is to provide an instrument including novel means to indicate air temperature and pressure.

Another object of the invention is to provide a novel heat insulated barometer.

Other objects and the advantages of this invention will be apparent from the following description taken in connection with the accompanying drawing, wherein:

Fig. 1 is a face view of my improved instrument;

Fig. 2 is an enlarged fragmentary longitudinal section through the device shown in Fig. 1;

Fig. 2A is an enlarged fragmentary sectional detail showing the inner end of the capillary tube;

Fig. 3 is an enlarged section taken on line 3—3, Fig. 2;

Fig. 4 is a front view of a further modified form of my invention; and

Fig. 5 is an enlarged fragmentary longitudinal section through the device shown in Fig. 4.

Referring to the drawing by reference characters I have indicated my improved instrument generally at 10. As shown the device includes an outer glass tube 12 which at the lower end merges into an elongated bulb portion 13. Within the tube 12 I provide a reduced glass capillary tube 14 which at the upper end flares outwardly and is fused to the outer tube 12 to form an open topped cup-like chamber 15. The lower end of the capillary tube 14 projects into and is fused to an enlarged elongated bulb member 16. The bulb 16 is of less length and diameter than the bulb 13. Between the bulbs 13 and 16 and between the tubes 12 and 14 I arrange suitable cushion spacers 17 and 17'.

Within the capillary tube 14 I provide a drop of liquid 18 such as hydrochloric acid. To prevent the drop 18 from ever falling into the bulb 16 the lower end of the capillary tube is bevelled as at 19 and a tapered cup member 20 is fused thereto in such a manner as to leave a minute passageway 21 between the end of the capillary tube and the cup.

Projecting through the walls of the bulbs 13 and 16 and into the inner bulb 16 I provide a thermometer 22 with the bulb portion 23 thereof within the inner bulb 16. The thermometer member 22 is fused to both the inner and outer bulbs.

The tube 12 and the bulb 13 are evacuated through a neck 24 which is then closed and the bulb 16 preferably has a gas therein such as nitrogen which is inserted through a neck 24' which is then closed.

To prevent dust from entering the top of the capillary tube medical gauze or spun glass fabric is positioned in the chamber 15 as indicated at 24.

In Fig. 1 I have shown the device 10 as mounted on a support 25 to be used as a barometer. The support 25 has a neutral or zero point 26 indicated thereon adjacent the tube 12 and graduated indicia 27 is provided on the support at each side of the neutral point. Likewise adjacent the thermometer 22 the support has a neutral or zero point 28 indicated thereon and graduated indicia 29 at each side of the neutral point.

To exclude light and heat radiation from the capillary tube as much as possible the inner surface of the bulb 13 and the tube 12 are silvered as indicated at 30 and the outer surface of the bulb 16 and the capillary tube 14 are silvered as indicated at 31 in Fig. 3. A portion of the inner surface of the outer tube 12 is left unsilvered to provide a viewing area 32 and likewise a portion of the capillary tube 14 is unsilvered to provide a viewing area 33.

When the atmospheric pressure decreases the gas within the bulb 16 expands and forces the drop 18 upward and when the atmospheric pressure increases it forces the drop 18 down and compresses the gas within the bulb 16.

The thermometer indicates the temperature within the inner bulb 16 and by comparing the temperature indicated and the barometric pressure indicated by means of a prepared chart the combined effect of barometric pressure and the temperature upon a given subject may be determined.

In Figs. 4 and 5 I have indicated a further modification of my invention generally at 50. The device 50 is a combination barometer and thermometer and includes a length of glass capillary tubing 51 which adjacent the lower end extends into and is fused to an enlarged glass bulb 52. The lower end of the capillary tube 51 similar to the capillary tube 14 is bevelled as at 53 and a tapered cup member 54 is fused thereto in such a manner as to leave a minute passageway 55 between the end of the capillary tube and the cup.

Within the capillary tube 51 I provide a drop of liquid 56 such as hydrochloric acid. Surrounding the capillary tube 51 I provide an enlarged tube 57 which at the lower end is fused to the bulb 52.

The upper end of the capillary tube 51 is enlarged and fused to the outer tube 57 to form an open cup-like chamber 58 in which medical gauze or spun glass fiber is positioned to prevent foreign matter from entering the capillary tube.

The tube 57 is evacuated and gas such as nitrogen is placed in the bulb 52.

A thermometer 60 extends into and is fused to the bulb 52 with the bulb 61 of the thermometer positioned in the bulb 52.

It will be understood that if desired the enlarged tube 57 may be omitted from the modification should such a structure be desirable for certain uses. It will be understood that gases other than nitrogen may be employed and that indicators other than hydrochloric acid may also be employed and that the indicator may be suitably colored if desired.

From the foregoing it will be apparent that I have invented a novel scientific instrument which is extremely sensitive in use and which can be readily manufactured.

Having thus described my invention, I claim:

1. In an instrument of the class described, an outer tube having an enlarged bulb at one end, an inner capillary tube disposed within said outer tube, said inner tube having a bulb disposed within and spaced from the first bulb, spacing means between said bulbs and between said tubes, the space between said tubes and bulbs being exhausted, the outer end of said capillary tube being flared outwardly and fused to the wall of the outer tube to form a cup-like receptacle communicating with the outer end of the capillary tube and with the atmosphere, and a drop of fluid in said capillary tube and a filling of gas in said inner bulb and tube.

2. In an instrument of the class described, an outer tube having an enlarged bulb at one end, an inner capillary tube disposed within said outer tube, said inner tube having a bulb disposed within and spaced from the first bulb, spacing means between said bulbs and between said tubes, the space between said tubes and bulbs being exhausted, the outer end of said capillary tube being flared outwardly and fused to the wall of the outer tube to form a cup-like receptacle communicating with the outer end of the capillary tube and with the atmosphere, porous material in said receptacle, a drop of fluid in said capillary tube and a filling of gas in said inner bulb and tube, and a thermometer extending through the walls of said bulbs.

3. In an instrument of the class described, an outer tube having an enlarged bulb at one end, an inner capillary tube disposed within said outer tube, said inner tube having a bulb disposed within and spaced from the first bulb, spacing means between said bulbs and between said tubes, the space between said tubes and bulbs being exhausted, the outer end of said capillary tube being flared outwardly and fused to the wall of the outer tube to form a cup-like receptacle communicating with the outer end of the capillary tube and with the atmosphere, porous material in said receptacle, a drop of liquid in said capillary tube and a filling of gas in said inner bulb and tube, a thermometer tube extending through and fixed to the walls of said inner and outer bulbs, said thermometer tube having a bulb thereon and having a capillary aperture communicating with the bulb and a filling of heat responsive fluid in the thermometer tube bulb.

4. In an instrument of the class described, an outer tube having an enlarged bulb at one end, an inner capillary tube disposed within said outer tube, said inner tube having a bulb disposed within and spaced from the first bulb, spacing means between said bulbs and between said tubes, the space between said tubes and bulbs being exhausted, the outer end of said capillary tube being fused to the wall of the outer tube to form a receptacle communicating with the outer end of the capillary tube and with the atmosphere, filtering material in said receptacle, a drop of fluid in said capillary tube and a filling of gas in said inner bulb and tube, a thermometer tube extending through and fixed to the walls of said inner and outer bulbs, said thermometer tube having a bulb thereon and having a capillary aperture communicating with the bulb and a filling of heat responsive fluid in the thermometer tube bulb.

5. In an instrument of the class described, an outer receptacle, a capillary tube disposed within said receptacle, said tube having a bulb thereon, said tube communicating with the bulb the space between said receptacle and tube being exhausted, one end of said capillary tube being open to the atmosphere, a drip cup on the inner end of said capillary tube and within the bulb, a drop of fluid in said capillary tube and a filling of gas in said bulb and tube.

6. In an instrument of the class described, an outer tube having an enlarged bulb at one end, an inner capillary tube having an end open to the atmosphere and disposed within said outer tube, said inner tube having a bulb disposed within and spaced from the first bulb, the space between said tubes and bulbs being exhausted, the outer end of said capillary tube being secured to the wall of the outer tube, a drop of fluid in said capillary tube and a filling of gas in said inner bulb and tube.

GEORGE E. BARNHART.